(12) United States Patent
Altman et al.

(10) Patent No.: US 7,735,072 B1
(45) Date of Patent: Jun. 8, 2010

(54) METHOD AND APPARATUS FOR PROFILING COMPUTER PROGRAM EXECUTION

(75) Inventors: Erik R. Altman, Danbury, CT (US);
Kemal Ebcioglu, Katonah, NY (US);
Michael Karl Gschwind, Mohegan Lake, NY (US); Sumedh Sathaye, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 09/637,078

(22) Filed: Aug. 11, 2000

(51) Int. Cl.
*G06F 9/45* (2006.01)
*G06F 9/44* (2006.01)
(52) U.S. Cl. ...................... 717/158; 717/127
(58) Field of Classification Search ......... 717/124–135, 717/151, 152, 158
See application file for complete search history.

(56) References Cited

U.S. PATENT DOCUMENTS

| | | | | |
|---|---|---|---|---|
| 5,355,484 A | * | 10/1994 | Record et al. | 717/127 |
| 5,355,487 A | * | 10/1994 | Keller et al. | 717/127 |
| 5,465,258 A | * | 11/1995 | Adams | 717/128 |
| 5,590,354 A | * | 12/1996 | Klapproth et al. | 714/30 |
| 5,768,500 A | * | 6/1998 | Agrawal et al. | 714/47 |
| 5,815,720 A | * | 9/1998 | Buzbee | 717/158 |
| 5,835,702 A | * | 11/1998 | Levine et al. | 714/39 |
| 5,944,841 A | * | 8/1999 | Christie | 714/38 |
| 6,202,205 B1 | * | 3/2001 | Saboff et al. | 717/151 |
| 6,233,678 B1 | * | 5/2001 | Bala | 712/240 |
| 6,243,836 B1 | * | 6/2001 | Whalen | 714/45 |
| 6,351,844 B1 | * | 2/2002 | Bala | 717/128 |
| 6,353,924 B1 | * | 3/2002 | Ayers et al. | 717/128 |
| 6,513,155 B1 | * | 1/2003 | Alexander et al. | 717/124 |
| 6,598,221 B1 | * | 7/2003 | Pegatoquet et al. | 717/152 |
| 6,622,300 B1 | * | 9/2003 | Krishnaswamy et al. | 717/130 |

OTHER PUBLICATIONS

Ammons et al., "Exploiting Hardware Performance Counters with Flow and Context Sesitive Profiling", ACM, 1997, pp. 85-96.*
"Dictionary of Computing", Fourth Edition; Oxford University Press; 1996; pp. 26 and 432.*
Microsoft Press Computer Dictionary; Third Edition, 1997; pp. 297, 379-378.*
Chang et al., "Using Profile Information to Assist Classic Code Optimizations", Software-Practice and Experience, vol. 21(12), pp. 1301-1321 (Dec. 1991).
Altman et al., "Welcome to the Opportunities of Binary Translation", pp. 40-53, IEEE Computer, Mar. 2000.
Altman et al., "Dynamic and Transparent Binary Translation", pp. 54-59, IEEE Computer, Mar. 2000.
Michael D. Smith, "Tracing with *pixie*", Computer Systems Laboratory at Standord University, report CSL-TR-91-497, pp. 1-29, Nov. 1991.

(Continued)

*Primary Examiner*—Jason Mitchell

(57) ABSTRACT

According to a first aspect of the invention there is provided a method for profiling computer program executions in a computer processing system having a processor and a memory hierarchy. The method includes the step of executing a computer program. Profile counts are stored in a memory array for events associated with the execution of the computer program. The memory array is separate and distinct from the memory hierarchy so as to not perturb normal operations of the memory hierarchy.

35 Claims, 5 Drawing Sheets

OTHER PUBLICATIONS

Lee et al., "An Efficient Software-Hardware Collaborative Profiling Technique for Wide-Issue Processors", Proceedings of the 1999 Workshop on Binary Translation, Newport Beach, CA., Oct. 18, 1999, IEEE Computer Society Technical Committee on Computer Architecture Newsletter, pp. 34-42, Dec. 1999.

Cmelik et al., "Shade: A Fast Instruction-Set Simulator for Execution Profiling", Proceedings of the 1994 Conference on Measurement and Modeling of Computer Systems, Nashville, TN., SIGMETRICS, pp. 128-137, May 1994.

Altman et al., "Execution-based Scheduling for VLIW Architectures", EuroPar '99 Parallel Processing—5$^{th}$ International Euro-Par Conference, Berlin, Germany, pub. Springer Verlag, pp. 1269-1280, Aug. 1999.

Chrysos et al., "ProfileMe: Hardware Support for Instruction-Level Profiling on Out-of-Order Processors", Proceedings of the 30$^{th}$ Symposium on Microarchitecture (Micro-30), pp. 292-301, Dec. 1997.

Altman et al., "An Eight-Issue Tree-VLIW Processor for Dynamic Binary Translation", Proceedings of the 1998 International Conference on Computer Design (ICCD '98)—VLSI in Computers and Processors, Austin, TX., pub. IEEE Computer Society, pp. 488-495, Oct. 1998.

Ebcioglu et al., "An Architectural Framework for Supporting Heterogeneous Instruction-Set Architectures" IEEE Computer, Jun. 1993, pp. 39-56.

Altman et al., Daisy: Dynamic Compilation for 100% Architectural Compatibility, Proceedings of the 24$^{th}$ Annual International Symposium on Computer Architecture (ISCA 97), Denver, CO., pub. ACM, pp. 26-37, Jun. 1997.

* cited by examiner

METHOD AND APPARATUS FOR PROFILING COMPUTER PROGRAM EXECUTION

BACKGROUND

1. Technical Field

The present invention relates generally to computer programs and, in particular, to a method and apparatus for profiling computer program execution.

2. Background Description

Contemporary high-performance processors rely on superscalar, superpipelining, and/or very long instruction word (VLIW) techniques for exploiting instruction-level parallelism in programs (i.e., for executing more than one instruction at a time). In general, these processors contain multiple functional units, execute a sequential stream of instructions, are able to fetch from memory more than one instruction per cycle, and are able to dispatch for execution more than one instruction per cycle subject to dependencies and availability of resources.

The performance of programs can be greatly enhanced if information about the typical execution path of the programs is known so as to optimize program execution for such paths. To this end, program profile information is necessary which describes the typical execution behavior, such as, for example, the probability that a given branch is taken, the correlation between different branches and typical execution path information, the cache miss rate of a particular memory operation, and so forth.

An exemplary overview of the use of profile information in the compilation of programs is described by Chang, et al., in "Using Profile Information to Assist Classic Code Optimizations", Software Practice and Experience, Vol. 21(12), pp. 1301-21, December 1991.

Profiling can be used to optimize programs during static or dynamic compilation. The use of profile information in static compilation is described by Chang et al. in the above referenced article entitled "Using Profile Information to Assist Classic Code Optimizations". The use of profile information for dynamic optimization at program runtime is described by: Ebcioglu et al., in "Execution-Based Scheduling for VLIW Architectures", EuroPar '99 Parallel Processing—5th International Euro-Par Conference, Berlin, Germany, pub. Springer Verlag, pp. 1269-80, August 1999; and Gschwind et al., in "Dynamic and Transparent Binary Translation", IEEE Computer, pp. 54-59, March 2000.

Many techniques have been proposed to perform profiling of executing programs. Traditionally, static (compile- and/or link-time) instrumentation of code has been used to modify code to generate and gather profile information. A separate run of the program is then performed, which generates and stores the information on disk. The profile is then read back in by the compiler back-end and used to optimize the code. This technique is implemented in tools such as XPROF and PIXIE. This technique has the disadvantage that the execution pass made for the express purpose of profiling typically has high overhead, and since it is conducted in laboratory conditions, may not gather the actual profile of the program under end-user control. Hence the usefulness of the technique is limited. Static instrumentation for profiling and the use of profile information for optimization is described by Chang et al., "Using Profile Information to Assist Classic Code Optimizations", Software Practice and Experience, Vol. 21(12), pp. 1301-21, December 1991. PIXIE is described by M. Smith, in "Tracing with PIXIE", No. CSL-TR-91-497, Center for Integrated Systems, Stanford University, pp. 1-29, November 1991.

Dynamic instrumentation of program code, which is an extension of the static instrumentation technique, inserts the instrumentation code at run-time. This approach suffers from the drawback that most of the information that the compiler has about the syntax and the semantics of the program statically is unavailable dynamically. Hence, it can only make crude guesses about the nature of the instrumentation to be inserted into the program. Further, the instrumentation code also slows the mainline execution of the program, just as in the static case. The SHADE emulator on the Sun SPARC architecture performs dynamic instrumentation to some extent. A description of a reference to this emulator is provided hereinbelow.

Emulation of an architecture can be used to run a program, and profile information can be collected using access methods to the internal architectural state of the emulated machine. This approach has two drawbacks: (1) the emulation is quite slow (typically 10 to 100 emulator instructions per emulated instruction), and (2) the profile information is only accurate at the ISA level; none of the microarchitectural bottlenecks can be captured and identified under the emulation technique. Various emulators have been described in the literature, such as, for example: Keppel et al., in "SHADE: A Fast Instruction-set Simulator for Execution Profiling", Proceedings of the 1994 Conference on Measurement and Modeling of Computer Systems, Nashville, Tenn., SIGMETRICS, pp. 128-137, May 1994.

Dedicated Counters are available on modern processors such as PowerPC 604e and Pentium Pro, which can be programmed to watch for specific hardware events, and count them. Using dedicated counters is desirable because they do not perturb the other system state (such as the data cache), when counting is performed. However, there are some drawbacks to this approach. The counters cannot distinguish between multiple user-mode programs, losing some level of accuracy. Also, the information gathered is summary information, at a higher level of granularity. The approach is described in the International Business Machines Corp. PowerPC 604e User's Manual, IBM Order No. SA14-2044-00, IBM Microelectronics, Essex Junction, Vt. Using counters in memory is not a very good idea for profiling, because the counters then reside in the memory of the machine, which means they are accessed (read from and written to) the data caches. This perturbs the very behavior of the program that the instrumentation code attempts to measure.

Special instructions to support profiling is another technique, a flavor of which was described in a proposal for the recently unveiled IA-64 from Intel. According to this approach, the IA-64 uses an "initprof" instruction for initializing a memory area for collecting profile information. The instruction encodes enough information for the machine hardware to accurately gather and store away relevant profile information. This technique can be seen as a variant of the static instrumentation techniques, but with less overhead. The drawback of this technique is that the application still must be instrumented with these special instructions, a proposition that the software developers are less likely to accept for their final, production versions of code that are shipped to end customers. The counters are stored in the memory of the machine, which again leads to the data-cache perturbation problem. The initprof instruction is further described by Lee et al., in "An Efficient Software-Hardware Collaborative Profiling Technique for Wide-Issue Processors", Proceedings of the 1999 Workshop on Binary Translation, Newport Beach, Calif., Oct. 18, 1999, IEEE Computer Society Technical Committee on Computer Architecture Newsletter, pp. 34-42, December 1999.

A method of profiling, referred to as PROFILEME, tracks a sample of instructions in an out-of-order microarchitecture. The technique enables "observation" of all of the work that is performed on behalf of an arbitrary instruction that flows through the pipeline of an OOO processor core. The main focus is not to collect the aggregate information, but to observe the behavior of a given instruction as the instruction flows. This view is orthogonal to the technique of the invention. PROFILEME is described by Chrysos et al., "PROFILEME: Hardware Support for Instruction-Level Profiling on Out-of-Order Processors", Proceedings of the 30th Symposium on Microarchitecture (Micro-30), pp. 292-301, December 1997.

Therefore, it is evident that there is a need for a method and/or apparatus for profiling which: (1) can provide accurate resolution of profile information for a significant number of simultaneously profiled events; (2) does not disturb the program execution behavior of the program being profiled; (3) offers high performance; (4) is useable to profile in real-time; (5) does not require changes to the application being profiled; and (6) provides profile information for use in dynamic optimization at program runtime.

SUMMARY OF THE INVENTION

The problems stated above, as well as other related problems of the prior art, are solved by the present invention, a method and apparatus for profiling computer program execution.

According to a first aspect of the invention there is provided a method for profiling computer program executions in a computer processing system having a processor and a memory hierarchy. The method includes the step of executing a computer program. Profile counts are stored in a memory array for events associated with the execution of the computer program. The memory array is separate and distinct from the memory hierarchy so as to not perturb normal operations of the memory hierarchy.

According to a second aspect of the invention, the method further includes the step of updating the profile counts.

According to a third aspect of the invention, the storing and updating steps are performed asynchronously to prevent a decrease of an execution speed of the computer program.

According to a fourth aspect of the invention, the updating step is triggered by execution of the events.

According to a fifth aspect of the invention, the updating step is triggered by execution of instructions embedded into an instruction stream of the computer program.

According to a sixth aspect of the invention, the method further includes the step of detecting whether a profile count has exceeded an adjustable predefined threshold.

According to a seventh aspect of the invention, the method further includes the step of indicating when a profile count has exceeded an adjustable predefined threshold.

According to an eighth aspect of the invention, the indicating step includes the step of raising an exception.

According to a ninth aspect of the invention, the method further includes the steps of accumulating profile updates, and dividing the accumulated profile updates by a threshold fraction.

According to a tenth aspect of the invention, the method further includes the step of scaling the profile counts to prevent profile information overflow.

According to an eleventh aspect of the invention, the method further includes the step of identifying profile information corresponding to the profile counts using a profiling event identifier.

According to a twelfth aspect of the invention, the method further includes the step of addressing the memory array, using the profiling event identifier.

According to a thirteenth aspect of the invention, the method further includes the steps of generating the profile counts using profile counters associated with the events, and maintaining the profile counters in a set-associate manner.

According to a fourteenth aspect of the invention, the method further includes the step of selecting a profile counter to be evicted from the memory array based upon a predefined replacement, when a number of profiling events assigned to an associative class of events is exceeded.

According to a fifteenth aspect of the invention, the replacement strategy is based upon one of least-recently-used and first-in-first-out.

According to a sixteenth aspect of the invention, the method further includes the step of supporting read operations from the profile matrix in an off-line optimization of the program.

According to a seventeenth aspect of the invention, the method further includes the step of assisting at least one of compilation and optimization of the program, based upon the profile counts stored in the profile matrix.

According to an eighteenth aspect of the invention, the assisting step is performed during at least one of dynamic binary translation and dynamic optimization of the computer program.

According to a nineteenth aspect of the invention, the dynamic binary translation and dynamic optimization of the computer program results in translated and optimized code, respectively, the translated and optimized code including instructions groups which pass control therebetween.

According to a twentieth aspect of the invention, the method further includes the step of identifying frequently executed paths of the computer program, by instrumenting exits from the instruction groups with a profiling instruction that indicates a unique group exit identifier.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for profiling computer program execution. It is to be understood that the present invention may be implemented in various forms of hardware, software, firmware, special purpose processors, or a combination thereof. In some embodiments, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 5.

Figure 1:
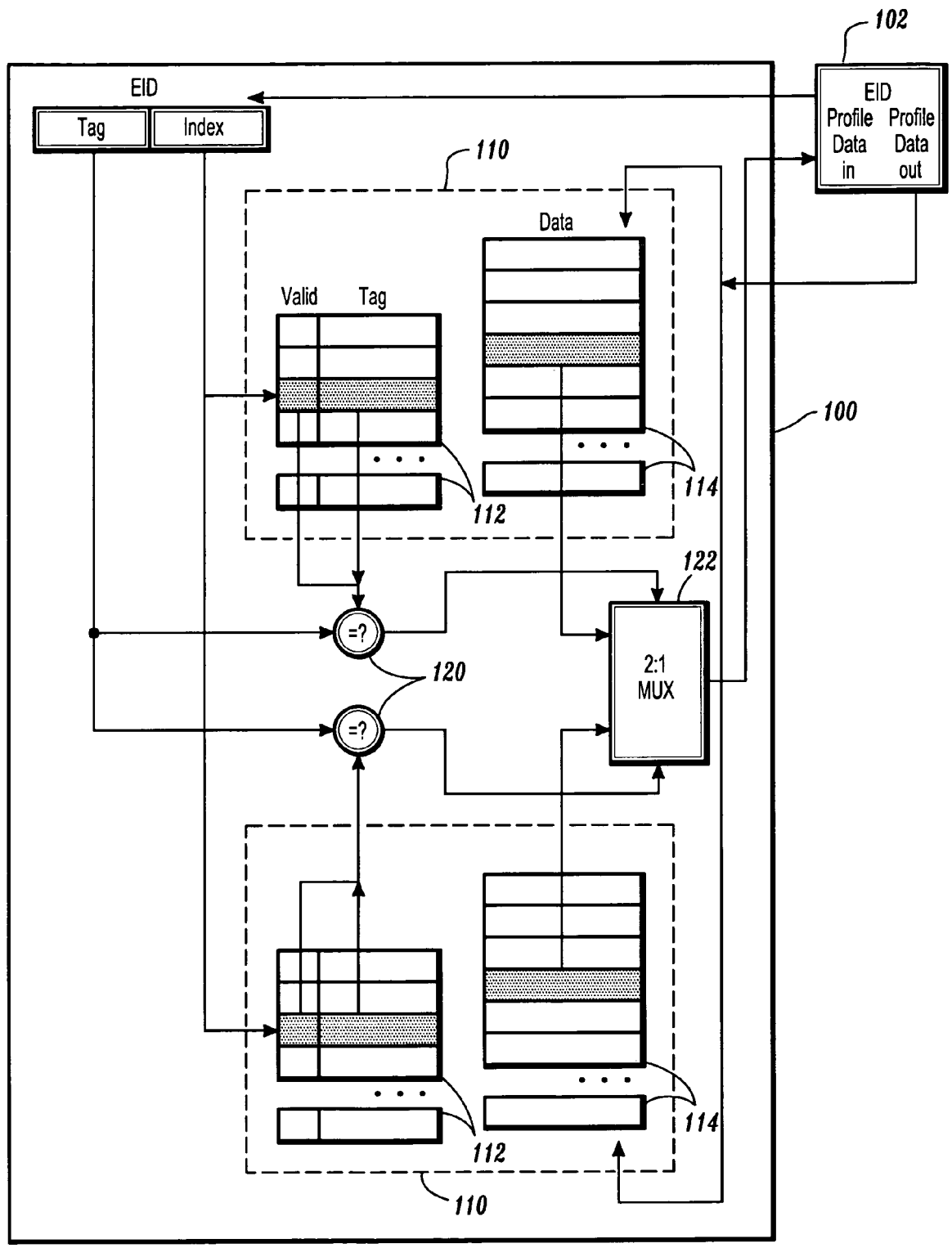
FIG. 1 is a block diagram illustrating a two-way set-associative profile matrix, according to an illustrative embodiment of the invention.

FIG. 1 is a block diagram illustrating a two-way set-associative profile matrix 100, according to an illustrative embodiment of the invention. In particular, there is shown a profile matrix 100 and a profile matrix controller 102. The profile matrix controller 102 may execute the methods of FIG. 3 or 4 described in detail hereinbelow.

The profile matrix 100 is a memory structure for storing profile information separate from the main memory hierarchy of the processor(s). This has the advantage of not disturbing the caching behavior of the program being profiled, thus allowing rapid access to profile counters without expensive cache misses. It is to be appreciated that implementation of the profile matrix 100 can be pipelined to work in parallel with the executing program.

The profile matrix 100 consists of two equivalence classes collectively represented by the reference numeral 110. Each equivalence class contains a tag array 112 and data array 114. The tag array 112 stores a Tag bit and a Valid bit. The profile matrix 100 is accessed by using an event identifier EID. The EID is split into an Index part used to access one of several elements in each associativity class, and a Tag part.

The Tag part is then used to select one of the fields from the several elements, or to indicate that no match is found using tag comparators 120 and multiplexer 122.

For illustrative purposes, the embodiment of FIG. 1 illustrates the profile matrix 100 arranged as a 2-way set associative array of identifiers. However, it is to be appreciated that alternate embodiments may use any level of associativity, such as 2, 3, 4, 5, 6, 7, 8 . . . -way associativity, or a direct-mapped, or fully associative configuration. Given the teachings of the invention provided herein, one of ordinary skill in the related art will readily contemplate these and various other configurations of the invention and the elements corresponding thereto.

It is to be appreciated that the profile counts may be scaled to prevent profile information overflow. Such scaling may be implemented for example, by using a memory array with a shift right capability similar to a shift register. Alternatively, the controller 102 may sequentially read, scale, and update each entry in the memory array. Given the teachings of the invention provided herein, one of ordinary skill in the related art will contemplate these and various other ways in which to scale the profile counts while maintaining the spirit and scope of the invention.

Figure 2:
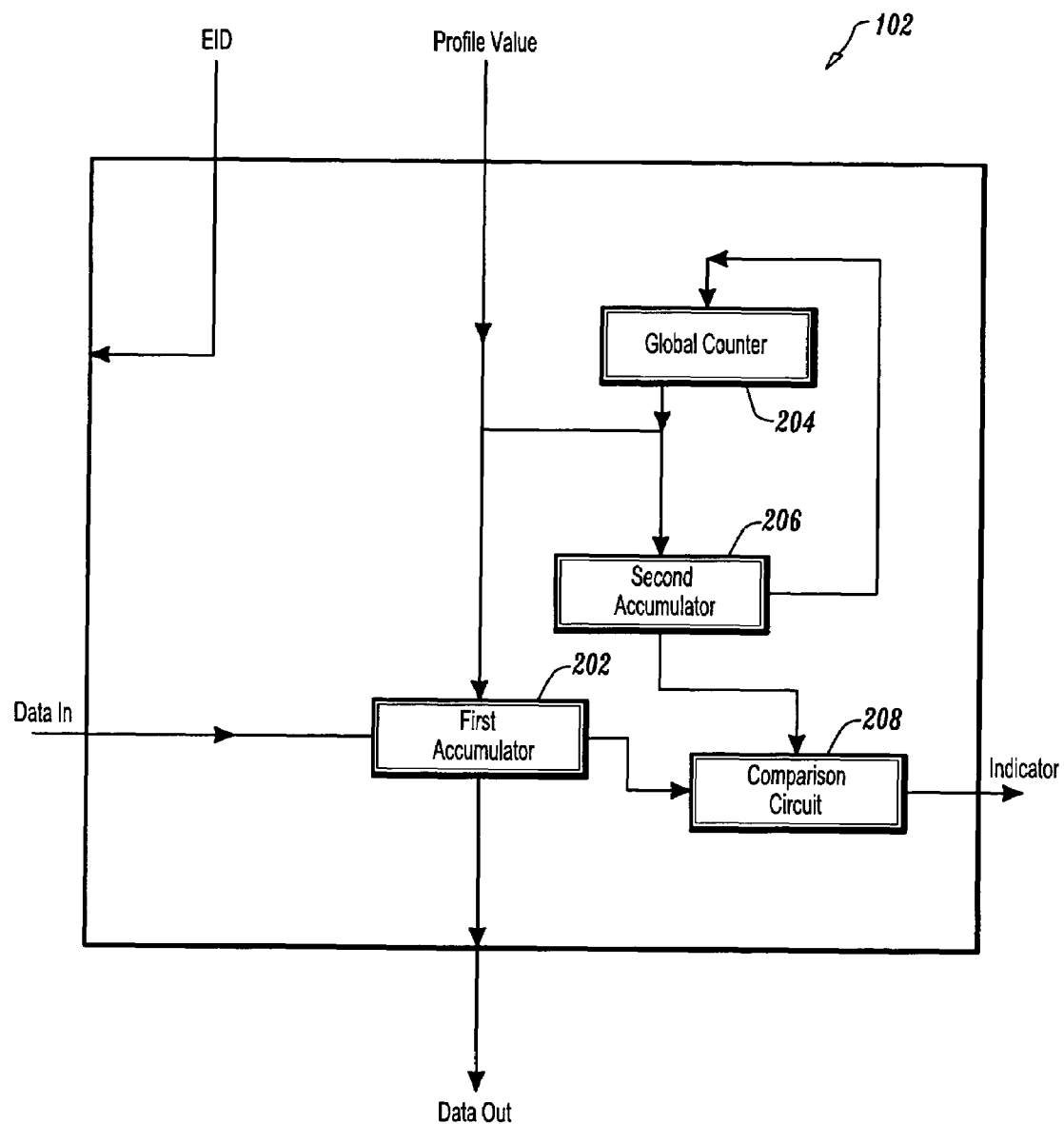
FIG. 2 a block diagram illustrating an exemplary profile matrix controller, according to an illustrative embodiment of the invention.

FIG. 2 is a block diagram illustrating an exemplary profile matrix controller 102, according to an illustrative embodiment of the invention. The profile matrix controller 102 may execute the method of FIG. 3 described in detail hereinbelow.

The profile matrix controller 102 receives an event identifier EID and an associated profile value from the CPU. The profile matrix controller 102 first performs a profile matrix lookup in profile matrix 100. If no matching value is found, then a defined initial value is indicated (typically 0), and a new counter is allocated in the matrix.

A first accumulation circuit 202 then accumulates profile values received from the CPU with the data value returned by the profile matrix. Accumulation is typically an addition, but can be implemented using any other logic function. The resulting value is returned to the profile matrix for updating the counter value associated with the event identifier.

Profile matrix controller 102 also contains a global counter 204 which is used to accumulate the value over all profiled events using the accumulation corresponding to a second accumulation circuit 206. Accumulation is typically an addition, but can be implemented as any other logic function. The resulting value is used to update the global counter 204.

The values computed by accumulation circuits 202 and 206 are compared by a comparison circuit 208 and, if a predefined condition is met, then an indicating step is performed. The comparison can be implemented one or more logic functions. For example, the comparison can be an arithmetic comparison, or testing whether one value is at least a fraction of the other value, or the computation of any other logic function. Given the teachings of the invention provided herein, one of ordinary skill in the related art will contemplate these and various other ways in which two or more value may be compared, while maintaining the spirit and scope of the invention.

The invention can be used to profile program data in several ways. A profile counter may contain a single value. Alternatively, a profile counter may store several values, such as, for example, the number of times a branch has been taken (or not taken). In one embodiment, profile events can be generated automatically, for example, every time a branch is processed. In another embodiment, an explicit instruction may be inserted to profile an event. This instruction may contain profile information to measure, for example, the contribution of each path through a translation to the overall program time, as described by Ebcioglu et al., in "Execution-Based Scheduling for VLIW Architectures", EuroPar '99 Parallel Processing—5th International Euro-Par Conference, Berlin, Germany, pub. Springer Verlag, pp. 1269-80, August 1999. The event identifier supplied to the profile matrix may be specified by an instruction, or the event identifier may be created dynamically, e.g., by the instruction address and an event-type specifier (describing the type of event, such as branch, cache access, cache miss, and so forth).

A profile matrix may be used to select program information for later off-line optimization using profile-directed feedback compilation, or for dynamic optimization, as used in the dynamic binary translation system described by Ebcioglu et al. in the above referenced article entitled "Execution-based Scheduling for VLIW Architectures". When used in conjunction with dynamic optimization "aging" is preferably applied to the counter values to maintain a stable threshold across the execution of the program. Aging is preferably performed periodically. In an optimized embodiment, aging is performed using a "shift right" operation on the entire profile matrix in a single cycle.

An optimized profile matrix may consist of a hierarchy of profile matrices (e.g., similar to caching hierarchies) to provide rapid access to frequently used profile information, while allowing a large aggregate profile matrix size.

Figure 3:
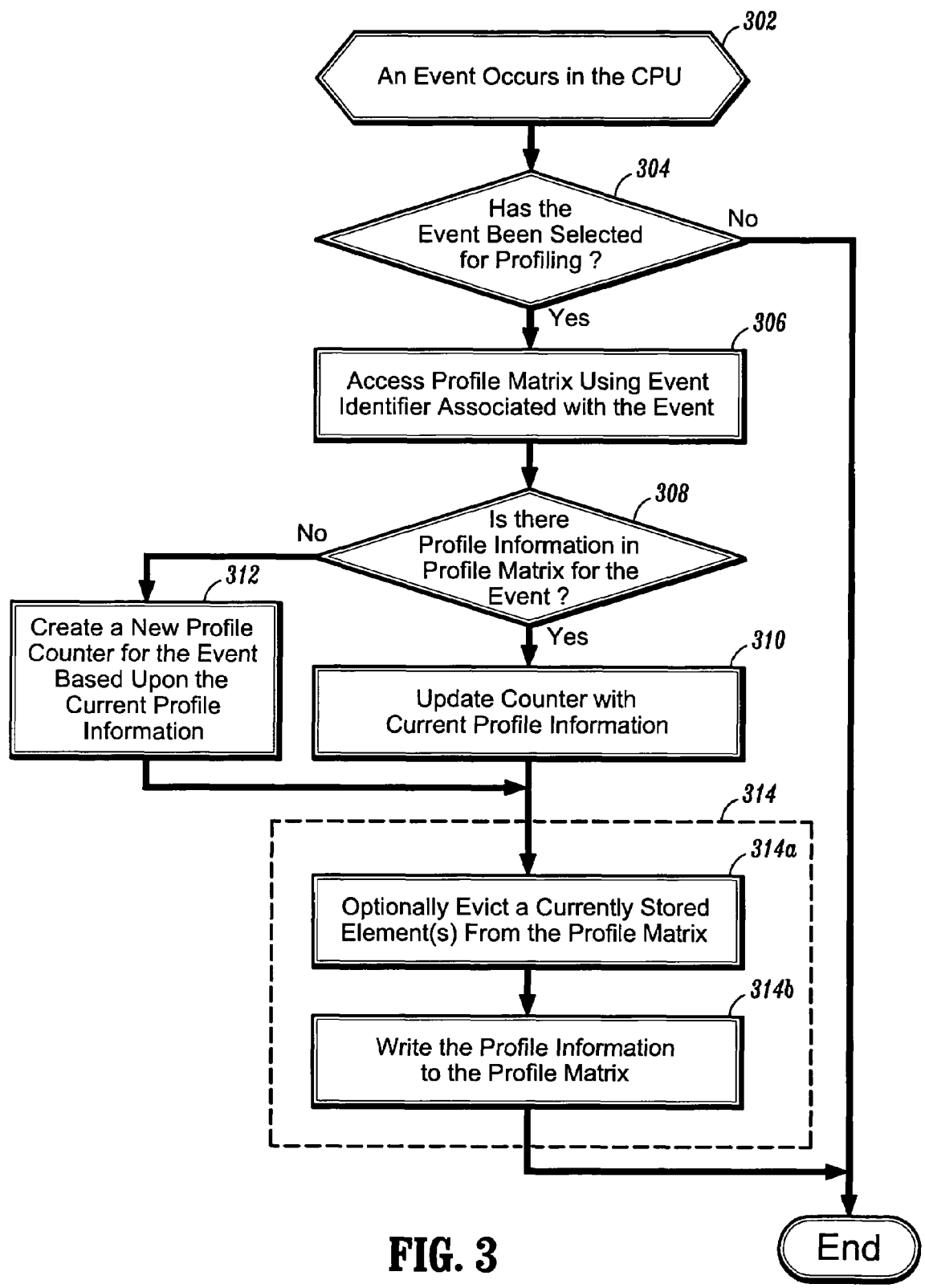
FIG. 3 is a flow diagram illustrating the operation of a profile matrix for profiling computer program execution, according to an illustrative embodiment of the invention.

FIG. 3 is a flow diagram illustrating the operation of a profile matrix for profiling computer program execution, according to an illustrative embodiment of the invention. As stated above, the method may be executed by the profile matrix controller 102 of FIG. 1.

Upon an event occurring in the CPU (302), it is determined whether the event has been selected (designated) for profiling (step 304). If the event has not been selected for profiling, then the method terminates.

In contrast, if the event has been selected for profiling, then the profile matrix 100 is accessed using the event identifier associated with the selected event (step 306), and it is determined whether there exists profile information in the profile matrix 100 for the selected event (step 308). Such profile information is maintained by a counter in the profile matrix 100. If such profile information is found, then the method proceeds to step 310. Otherwise, the method proceeds to step 312.

At step 310, the counter for the event is updated with the current profile information, and the method proceeds to step 314. At step 312, a new profile counter is created (initialized) for the event based on the current profile information, and the method proceeds to step 314.

Step 314 includes steps 314a and 314b. At step 314a, a currently stored element(s) in the profile matrix 100 may optionally be evicted when, for example, a new profile counter was created at step 312 and no further empty entries are available in the profile matrix 100. Eviction can be based on any replacement strategy, such as, for example, random-replacement, first-in-first-out (FIFO) or least-recently-used (LRU). The profile information is written to the profile matrix 100 (step 314b).

Figure 4:
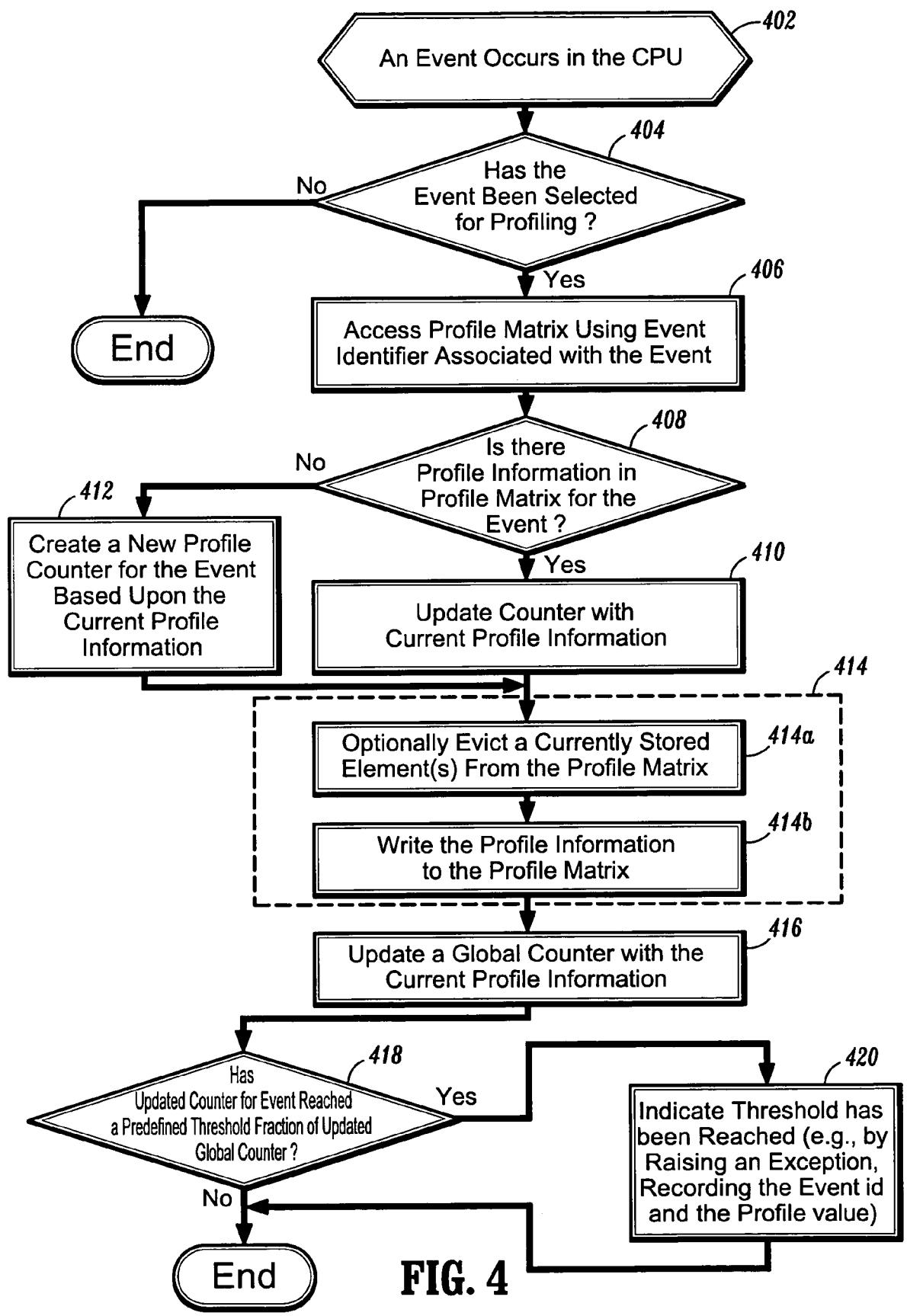
FIG. 4 is a flow diagram illustrating the operation of a profile matrix with threshold indicator functionality for profiling computer program execution, according to an illustrative embodiment of the invention.

FIG. 4 is a flow diagram illustrating the operation of a profile matrix with threshold indicator functionality for profiling computer program execution, according to an illustrative embodiment of the invention. The method of FIG. 4 may be executed by the profile matrix controller 102 of FIG. 1.

Upon an event occurring in the CPU (402), it is determined whether the event has been selected (designated) for profiling (step 404). If the event has not been selected for profiling, then the method terminates.

In contrast, if the event has been selected for profiling, then the event identifier EID is used to access the profile matrix 100 (step 406), and it is determined whether there exists profile information in the profile matrix 100 for the selected event (step 408). Such profile information is maintained by a counter in the profile matrix 100. If such profile information is found, then the method proceeds to step 410. Otherwise, the method proceeds to step 412.

At step 410, the counter for the event is updated with the current profile information, and the method proceeds to step 414. At step 412, a new profile counter is created (initialized) for the event based on the current profile information, and the method proceeds to step 414.

Step 414 includes steps 414a and 414b. At step 414, a currently stored element(s) in the profile matrix 100 may optionally be evicted when, for example, a new profile counter was created at step 412 and no further empty entries are available in the profile matrix 100. Eviction can be based on any replacement strategy, such as, for example, random-replacement, first-in-first-out (FIFO) or least-recently-used (LRU). The profile information is written to the profile matrix 100 (step 416).

A global counter is updated with the current profile information (step 416). It is then determined whether the counter (corresponding to the current profile entry) updated at step 114 has reached a predefined threshold fraction of the global counter updated at step 216 (step 418). If the threshold has been reached, then such condition is indicated (step 420), for example, by raising an exception and recording the event id, and the profile value.

Figure 5:
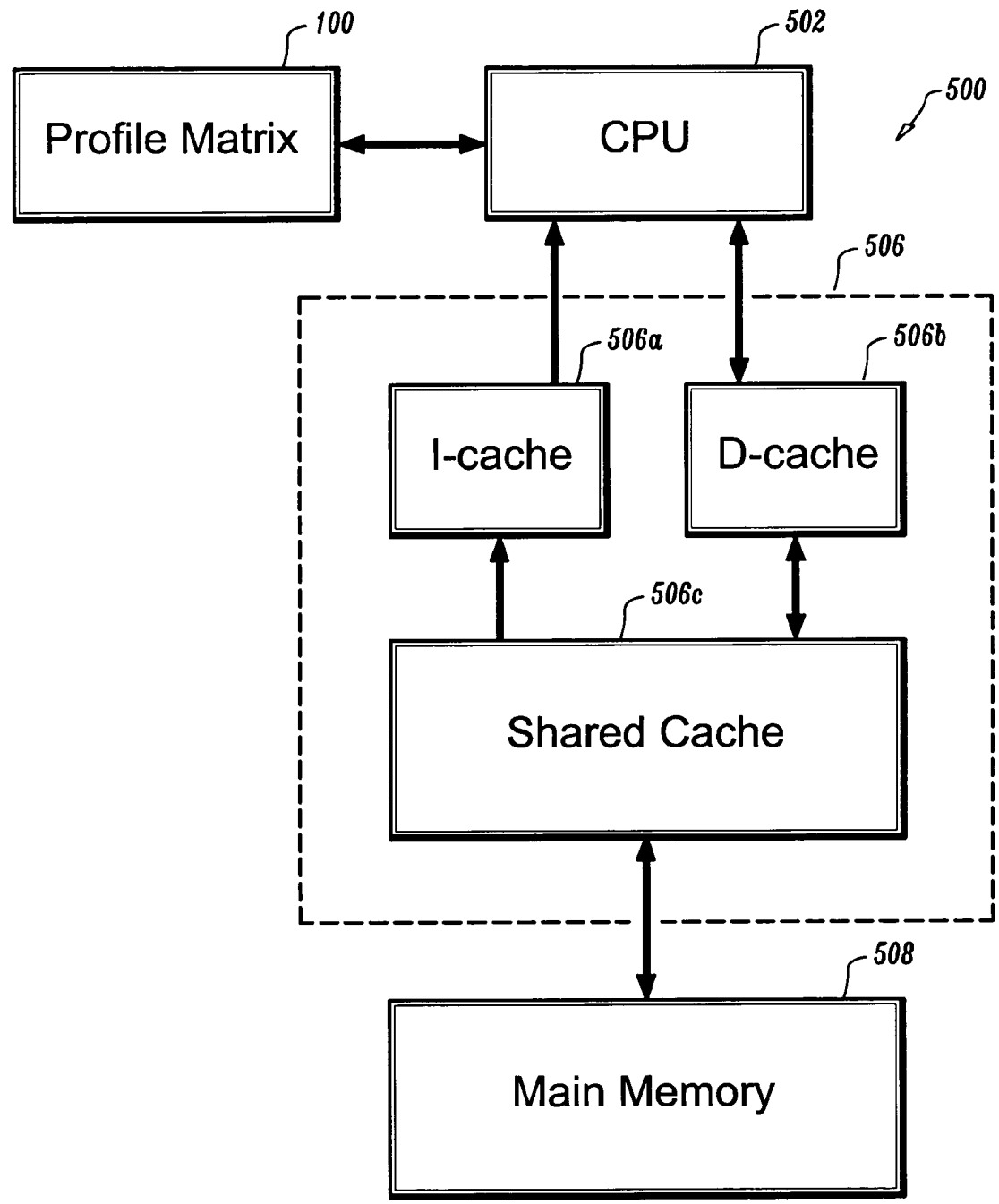
FIG. 5 is a diagram illustrating an exemplary computer processing system employing the invention, according to an illustrative embodiment thereof.

FIG. 5 is a diagram illustrating an exemplary computer processing system 500 employing the invention, according to an illustrative embodiment thereof. The system 500 includes a central processing unit (CPU) 502, operatively coupled to the profile matrix 100 and a cache hierarchy 506. The cache hierarchy 506 is operatively coupled to main memory 508. The cache hierarchy includes an instruction cache (I-cache) 506a, a data cache (D-cache) 506b, a shared cache 506c.

The profile matrix 100 is a separate hardware unit, which is distinct from the memory hierarchy. In this exemplary embodiment, the functionality of the profile matrix controller 102 described above is included in the CPU 502.

The profile matrix 100 is used to determine the optimization of dynamically translated code from one instruction set architecture to another instruction set architecture. The details of binary translation are described by: Ebcioglu et al., in "Dynamic Compilation for 100% Architectural Compatibility", Proceedings of the 24th Annual International Symposium on Computer Architecture (ISCA '97), Denver, Colo., pub. ACM, pp. 26-37, June 1997; Ebcioglu et al., in "An Eight-Issue Tree-VLIW for Dynamic Binary Translation", Proceedings of the 1998 International Conference on Computer Design (ICCD '98)—VLSI in Computers and Processors, Austin, Tex., pub. IEEE Computer Society, pp. 488-95, October 1998; Ebcioglu et al., in "Execution-Based Scheduling for VLIW Architectures", EuroPar '99 Parallel Processing—5th International Euro-Par Conference, Berlin, Germany, pub. Springer Verlag, pp. 1269-80, August 1999. In the embodiment of FIG. 5, the CPU 502 is a DAISY VLIW processor.

In what follows, the "base architecture" refers to the architecture with which we are trying to achieve compatibility, e.g., PowerPC or S/390 as described by Ebcioglu et al., in "An Architectural Framework for Supporting Heterogeneous Instruction-Set Architectures", IEEE Computer, Vol. 26, No. 6, pp. 39-56, June 1993. The examples described herein will be for a PowerPC architecture. To avoid confusion, PowerPC instructions are referred to as "operations", and the term "instructions" is reserved for VLIW instructions (each potentially containing many PowerPC operations).

From the actually executed portions of the base architecture binary program, dynamic compilation creates a VLIW program consisting of tree regions, which have a single entry (root of the tree) and one or more exits (terminal nodes of the tree).

Dynamic translation interprets code when a fragment of base architecture code is executed for the first time. As base architecture instructions are interpreted, the instructions are also converted to execution primitives (these are very simple RISC-style operations and conditional branches). These execution primitives are then scheduled and packed into VLIW tree regions which are saved in a memory area which is not visible to the base architecture. Any untaken branches, i.e., branches off the currently interpreted and translated trace, are translated into calls to the binary translator. Interpretation and translation stops when a stopping condition has been detected. The last VLIW of an instruction group is ended by a branch to the next tree region.

Then, the next code fragment is interpreted and compiled into VLIWs, until a stopping condition is detected. This is repeated for the next code fragment and so on. If and when the program decides to go back to the entry point of a code fragment for which VLIW code already exists, then the program branches to the already compiled VLIW code. Recompilation is not required in this case.

In order to obtain the best performance, the ILP goal or maximum window size are not made constants. Instead, a tree region is initially scheduled with modest ILP and window size parameters. If this region eventually executes only a few times, this represents a good choice for conserving code size and compile time.

If it is later found that the time spent in a tree region tip is greater than a threshold fraction "thresh" of the total cycles spent in the program, then this area is optimized much more aggressively, for example, by using a much higher ILP goal and larger window size. Thus, if there are parts of the code which are executed more frequently than others (implying high re-use on these parts), they will be optimized very aggressively. If, on the other hand, the program profile is flat and many code fragments are executed with almost equal frequency, then no such optimizations occur, which represents a good strategy for preserving the resources of the I-Cache 506a resources and translation time.

Frequently executed groups are detected by using the profile matrix 100. When a group is formed, each exit of the group is instrumented by placing a profile instruction at the exit of the group. The profile instruction contains an event id which uniquely describes the exit of a translation group. In addition, it also contains a profile count value which specifies the number representing the execution time from the group entry to the present exit. Presently, an 8192 entry, 8-way set associative profile matrix is employed. Since the profile matrix is not part of the memory hierarchy, it offers the advantage of not disrupting the D-cache 506b which would occur if the profile counts were to be stored in memory. In addition, the profile matrix 100 allows simple, pipelined implementations.

Turning now to the operation of the profile matrix 100 in this particular embodiment, the profile matrix controller accumulates the values for each event, as well as performs a global accumulation in a counter (as described with respect to the method of FIG. 4 and the controller block diagram of FIG. 2). As groups of instructions are translated, the following operation is placed at each exit of each group:

count tipId, Cycles On Path

The operation supplies a tipID (which uniquely identifies a group exit, also known as tip, and serves as an event identifier in this particular embodiment). Accumulation circuit 202 is implemented as a simple addition. Accumulation circuit 206 contains a weighting logic to increment the global counter 204 with a specified fraction of the supplied input value, resulting in the global counter containing an approximation of a specified fraction of the execution time. Comparison logic 208 tests whether the current tip exceeds the specified fraction of execution time stored in the counter and, if so, then performs an indicating step which is implemented by raising an exception in the CPU.

An alternative implementation may accumulate the full value of the execution time in the global counter 204 by using a simple addition for the accumulation circuit 206, and using comparison logic which divides the value of the global profile counter 204 before performing a comparison. Given the teachings of the invention provided herein, one of ordinary skill in the related art will contemplate these and various other embodiments of the invention, while maintaining the spirit and scope thereof.

The tipId is a number identifying the tree region tip (and could partly be taken from the VLIW instruction address and parcel number). Cycles On Path is approximately the number of VLIWs on the path from the root of the tree region to the tip.

A description of this count operation will now be given. If ctr[tipId] is not present in the counter cache, then ctr[tipId] is inserted with value Cycles On Path, and the least recently accessed counter in that congruence class is bumped out of the cache to make space if needed. If ctr[tipId] is present, then ctr[tipId] is incremented by Cycles On Path. If the result is greater than the hardware counter "Total Cycles Times Thresh" (i.e., the global counter 204), then a profile exception is generated that reports the responsible tipId (i.e., indicating step 420). The interrupt need not occur immediately after the overflow-causing count instruction as seen by the processor and, thus, the counter stages (e.g. Fetch Ctr, Add, Store-back and Compare, and Propagate Exception Signal) can be pipelined.

When the profile matrix generates a profile exception because a particular path in a group has exceeded a threshold of overall execution, the native VLIW exception handler is invoked. The exception handler identifies the cause of the exception and, upon identifying the cause of the exception as a profile matrix exception, dispatches control to the translator module responsible for re-optimizing a group and supplies the tipId to identify which path through a group should be re-optimized and extended. The translator can then optimize the newly identified important program path which constitutes at least a threshold fraction of the overall program execution time and further optimize the path to increase overall program performance.

Although the illustrative embodiments have been described herein with reference to the accompanying drawings, it is to be understood that the invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed:

1. A method for profiling executions of a plurality of computer programs in a computer processing system having a processor for executing the plurality of computer programs, the processor including a profile matrix controller, a memory hierarchy for aiding in execution of the programs, and a profile matrix that is operatively coupled to the processor via the profile matrix, and that is separate and independent from the memory hierarchy for aiding in the profiling of the computer programs and the processor, the method comprising the steps of:

executing, by the processor, each of the computer programs to generate an event identifier (EID) for each program, the EID comprising an index and a tag of a profiled event of the computer program;

sending the EIDs from the CPU to the profile matrix;

accessing, for each EID, an element of the profile matrix using the index and comparing a part of the element with the tag to determine whether a profile count exists for the profiled event;

updating, for each EID, the profile count if it exists or creating a new profile count in the profile matrix for the profiled event otherwise; and optimizing the computer program, based upon the profile counts.

2. The method according to claim 1, wherein said updating step is triggered by execution of instructions embedded into an instruction stream of the computer program.

3. The method according to claim 1, further comprising the step of detecting whether a profile count has exceeded an adjustable predefined threshold.

4. The method according to claim 1, further comprising the step of indicating when a profile count has exceeded an adjustable predefined threshold.

5. The method according to claim 4, wherein said indicating step comprises the step of raising an exception.

6. The method according to claim 1, further comprising the steps of:

accumulating the profile counts;

dividing the accumulated profile counts by a threshold fraction.

7. The method according to claim 1, further comprising the step of scaling the profile counts to prevent profile information overflow.

8. The method according to claim 1, further comprising the steps of:

generating the profile counts using profile counters associated with the events; and maintaining the profile counters in a set-associate manner.

9. The method according to claim 8, further comprising the step of selecting a profile counter to be evicted from the profile matrix based upon a predefined replacement, when a number of profiling events assigned to an associative class of events is exceeded.

10. The method according to claim 9, wherein the replacement strategy is based upon one of least-recently-used and first-in-first-out.

11. The method according to claim 1, further comprising the step of supporting read operations from the profile matrix in an off-line optimization of the program.

12. The method according to claim 1, wherein the optimizing is performed during at least one of dynamic binary translation and dynamic optimization of the computer program.

13. The method according to claim 12, wherein the dynamic binary translation and dynamic optimization of the computer program results in translated and optimized code, respectively, the translated and optimized code comprising instructions groups which pass control therebetween.

14. The method according to claim 13, further comprising the step of identifying frequently executed paths of the computer program, by instrumenting exits from the instruction groups with a profiling instruction that indicates a unique group exit identifier.

15. The method according to claim 13, further comprising the step of extending the instruction groups along a frequently executed path.

16. The method according to claim 1, wherein the memory hierarchy includes data and instruction caches.

17. A method for profiling execution of a plurality of computer programs in a computer processing system having a processor for executing the plurality of computer programs, the processor including a profile matrix controller, a memory hierarchy and a profile matrix that is operatively coupled to the processor via the profile matrix, and that is separate and independent from the memory hierarchy and the processor, the method comprising the steps of:

executing, by the processor, the computer programs to generate an event identifier (EID) for each program, the EID comprising an index to access an element of the profile matrix and a tag to determine whether the element corresponds to a profile count of the profile matrix;

storing, in the profile matrix, a plurality of event-specific profile counts using the EIDs, each count associated with a profiled event associated with an execution path of the corresponding computer program;

selecting at least one of the plurality of event-specific profile counts for profiling the path of one of the computer programs; and if at least one of the selected event-specific profile counts has exceeded a predefined threshold, optimizing the portions of the computer program associated with the event-specific profile counts.

18. The method according to claim 17, further comprising optimizing the portions of the computer program during at least one of static and dynamic compilation.

19. The method according to claim 17, wherein the profile matrix is arranged as a two-way set associative array.

20. A system for profiling computer program execution, the system comprising:

a central processing unit (CPU) for executing computer programs, the CPU including a profile matrix controller;

a main memory;

a cache hierarchy operatively coupled to the CPU and the main memory; and a profile matrix operatively coupled to the CPU via the profile matrix controller, the profile matrix including storage for profile counts of events for each of a plurality of the computer programs designated for profiling, wherein the profile matrix controller is configured to receive an event identifier (EID) of the events associated with one of the profiled computer programs and an associated profile value from the CPU in response to an occurrence of the profiled event in the CPU and output the EID and the profile value to the profile matrix to update the associated profile count within the profile matrix, wherein the profile matrix is separate and independent from the cache hierarchy, the main memory, and the CPU, and wherein the EID includes an index to address an element of the profile matrix and a tag to indicate whether a profile count for the EID is present within the profile matrix.

21. The system of claim 20, wherein the EID indicates an event type of one of a branch, a cache access, or cache miss.

22. The system of claim 21, wherein the associated profile value indicates one of whether the event type has occurred or a count of a number of the times the event type has occurred.

23. The system of claim 20, wherein both the cache hierarchy and main memory are excluded from profiling the computer programs and the profile matrix is excluded from aiding in the execution of the computer programs.

24. The system of claim 20, wherein the profile matrix comprises:

a first data array storing the profile counts of a first group of the profiled computer programs; and a first tag array of tags, each tag configured to be compared with the tag of the EID to determine whether the first data array includes a profile count for the EID;

wherein the tag of the EID is used to address a second tag of the first tag array, and wherein the tag of the EID is configured to be compared to the second tag to determine whether a corresponding profile count is present in the first data array for output to the profile matrix controller.

25. The system of claim 20, wherein the profile matrix includes a comparator to compare the tag of the EID to the second tag.

26. The system of claim 25, wherein the profile matrix further comprises:
a second data array storing profile counts of a second other group of the profiled computer programs;
a second tag array storing tags, each tag configured to be compared with the tag of the EID to determine whether the second data array includes a profile count for the EID;
a second comparator configured to compare the tag of the EID with tags of the second tag array; and
a multiplexer configured to receive an output of the first and second comparators to control whether to output one of a profile count from the first data array or the second data array to the profile matrix controller.

27. The system of claim 20, wherein the profile matrix controller comprises:
an accumulator configured to perform a logic operation on the associated profile value and an associated profile count output by the profile matrix and output a result of the logic operation to the profile matrix to update the profile count.

28. The system of claim 27, wherein the profile matrix controller further comprises:
a global counter configured to accumulate the result with subsequent results from subsequent profiled events using a second accumulator; and
a comparison circuit configured to compare a first output of the accumulator with a second output of the second accumulator to output an indicator.

29. The system of claim 28, wherein the comparison circuit compares whether the first output is at least a predefined fraction of the second output.

30. The system of claim 20, wherein the system is configured to use the profile matrix to select profile counts of a profiled computer program for off-line optimization of the profiled computer program using a profile-directed feedback compilation.

31. The system of claim 20, wherein the system is configured to use the profile matrix to select profile counts of a profiled computer program for optimization of the profiled computer program using dynamic optimization.

32. The system of claim 20, wherein the profile counts are aged periodically using a shift right operation on the entire profile matrix in a single cycle.

33. The system of claim 20, wherein the system is configured to evict profile counts from the profile matrix when the profile matrix is full.

34. The system of claim 20, further comprising a scaling circuit adapted to scale the profile counts to prevent overflow.

35. The system of claim 20, wherein the cache hierarchy comprises:
an instruction cache;
a data cache; and
a shared cache,
wherein the shared cache is operatively coupled between the main memory, the instruction cache, and the data cache,
wherein the instruction cache is operatively coupled between the shared cache and the CPU, and
wherein the data cache is operatively coupled between the shared cache and the CPU.

* * * * *